（12） United States Patent
Grasser et al.

(10) Patent No.: US 10,461,305 B2
(45) Date of Patent: Oct. 29, 2019

(54) BATTERY CELL AND BATTERY SYSTEM

(71) Applicant: Robert Bosch GmbH, Stuttgart (DE)

(72) Inventors: Andreas Grasser, Reckendorf (DE); Holger Reinshagen, Bamberg (DE); Martin Gerlach, Strullendorf (DE)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 15/546,722

(22) PCT Filed: Jan. 28, 2016

(86) PCT No.: PCT/EP2016/051748
§ 371 (c)(1),
(2) Date: Jul. 27, 2017

(87) PCT Pub. No.: WO2016/120359
PCT Pub. Date: Aug. 4, 2016

(65) Prior Publication Data
US 2018/0013122 A1    Jan. 11, 2018

(30) Foreign Application Priority Data

Jan. 30, 2015  (DE) .................. 10 2015 201 655

(51) Int. Cl.
H01M 2/00      (2006.01)
H01M 2/26      (2006.01)
(Continued)

(52) U.S. Cl.
CPC ........... *H01M 2/263* (2013.01); *H01M 2/024* (2013.01); *H01M 2/028* (2013.01);
(Continued)

(58) Field of Classification Search
CPC .... H01M 2/263; H01M 10/0431; H01M 2/14; H01M 2/024; H01M 2/0285;
(Continued)

(56) References Cited

U.S. PATENT DOCUMENTS

2006/0127751 A1*  6/2006  Woo ................... H01M 2/1653
                                                 429/128
2007/0154806 A1   7/2007  Hirose et al.
(Continued)

FOREIGN PATENT DOCUMENTS

CN    104078631 A    10/2014
EP    0924779        6/1999
(Continued)

OTHER PUBLICATIONS

International Search Report for Application No. PCT/EP2016/051748 dated Apr. 29, 2016 (English Translation, 3 pages).

*Primary Examiner* — Nicholas P D'Aniello
(74) *Attorney, Agent, or Firm* — Michael Best & Friedrich LLP

(57) ABSTRACT

The invention relates to a battery cell (2), comprising a prismatically designed cell housing (3) with a cover surface (31), on which a negative terminal (11) and a positive terminal (12) are arranged, and at least one electrode coil (10) which is arranged inside the cell housing (3) and comprises a cathode (14) having cathode contact lugs (24) and an anode (16) having anode contact lugs (26). The cathode contact lugs (24) and the anode contact lugs (26) extend next to one another from the electrode coil (10) toward exactly one end face (35, 36) of the cell housing (3), the end face (35, 36) running at a right angle to the cover surface (31). The invention also relates to a battery system comprising at least one battery cell (2) according to the invention.

19 Claims, 7 Drawing Sheets

(51) Int. Cl.
  *H01M 2/02* (2006.01)
  *H01M 2/14* (2006.01)
  *H01M 10/04* (2006.01)

(52) U.S. Cl.
  CPC .......... *H01M 2/0285* (2013.01); *H01M 2/14* (2013.01); *H01M 10/0431* (2013.01); *H01M 2/0277* (2013.01); *H01M 10/0486* (2013.01); *H01M 2002/0297* (2013.01); *H01M 2220/20* (2013.01)

(58) Field of Classification Search
  CPC ............. H01M 2/028; H01M 10/0486; H01M 2220/20; H01M 2/0277; H01M 2002/0297
  See application file for complete search history.

(56) References Cited

U.S. PATENT DOCUMENTS

| | | |
|---|---|---|
| 2010/0028770 A1 | 2/2010 | Ryu et al. |
| 2012/0033845 A1 | 2/2012 | Maleki et al. |
| 2013/0288092 A1 | 10/2013 | Nidelkoff et al. |

FOREIGN PATENT DOCUMENTS

| | | |
|---|---|---|
| EP | 1071147 | 1/2001 |
| EP | 1089362 | 4/2001 |
| EP | 2675000 | 12/2013 |
| JP | 11260320 | 9/1999 |
| JP | 2001167744 A | 6/2001 |
| WO | 2007061262 | 5/2007 |

\* cited by examiner

BATTERY CELL AND BATTERY SYSTEM

BACKGROUND OF THE INVENTION

The present invention relates to a battery cell comprising a prismatically-designed cell housing having a cover surface, on which a negative terminal and a positive terminal are arranged, and at least one electrode coil arranged within the cell housing and having a cathode, which has cathode contact lugs, and having an anode, which has anode contact lugs. The invention also relates to a battery system comprising at least one battery cell according to the invention.

It is evident that, in the future, whether in stationary applications such as wind turbine installations, in motor vehicles which are configured as hybrid vehicles or electric vehicles, or in electronic devices such as laptop computers or mobile phones, new battery systems will be employed which will be subject to very stringent requirements with respect to reliability, safety, performance capability and service life.

So-called Lithium-ion battery cells are specifically employed for this purpose. These are characterized, amongst other features, by high energy densities, thermal stability and extremely low self-discharge capability. Lithium-ion battery cells have a positive and a negative electrode upon which, during a charging process and also during a discharging process, lithium ions can be reversibly deposited and also released again. A process of this type is also described as intercalation/deintercalation.

In general, a battery cell comprises one or more electrode units, which are configured in the form of a coil. An electrode unit incorporates two foil-type electrodes, namely an anode and a cathode. The electrodes are wound, with the interposition of a separator, to form an electrode coil, which is also described as a jelly-roll. The two electrodes in the electrode coil are electrically connected to the poles of the battery cell, which are also described as terminals, by means of collectors.

A battery cell further comprises a cell housing which is comprised, for example, of aluminum. The cell housing is generally configured as a prism, specifically as a cuboid, and is of pressure-resistant design. Further to the connection of the electrodes to the terminals, the cell housing is filled with an electrolyte solution.

A generic battery cell with an electrode coil is known from EP 2 675 000 A1. The anode and the cathode project from opposing sides of the electrode coil, parallel to the winding axis, and are each connected to a collector. The two collectors are oriented essentially perpendicularly to the winding axis of the electrode coil, and connect the anode and the cathode to the terminals.

A further generic battery cell is known from US 2010/0028770 A1. The electrodes of the electrode coil have contact lugs which project from the electrode coil and are connected to collectors. Prior to the connection with the collectors, the contact lugs are of different lengths.

For the electrical insulation of the electrodes and the cell housing, insulators are provided which are, for example, of plastic construction. An electrode coil with corresponding insulators for a battery cell is disclosed in US 2013/0288092 A1.

Lithium-ion battery cells are relatively sensitive to environmental influences, specifically to air and humidity. The aforementioned cell housing provides protection against said environmental influences. A plurality of such battery cells can be combined to form a battery system, which is also described as a battery pack.

SUMMARY OF THE INVENTION

A battery cell is proposed, comprising a prismatically-designed cell housing having a cover surface, on which a positive terminal and a negative terminal are arranged. The battery cell further comprises at least one electrode coil arranged within the cell housing and having an anode, which has anode contact lugs, and having a cathode, which has cathode contact lugs.

According to the invention, the anode contact lugs and the cathode contact lugs extend adjacently from the electrode coil toward precisely one end surface of the cell housing, wherein the end surface is oriented at right-angles to the cover surface. The anode contact lugs and the cathode contact lugs therefore extend toward the same end surface of the cell housing. In this case, the terminals are fitted to a different side of the cell housing, specifically to the cover surface. The end surface, toward which the anode contact lugs and the cathode contact lugs extend, adjoins the cover surface.

The cell housing is preferably cuboid-shaped and has six sides with three different surface areas wherein, in each case, two of the six sides of equal surface area are situated opposite one another. The end surface, toward which the anode contact lugs and the cathode contact lugs extend, adjoins the cover surface in this case.

The anode contact lugs and the cathode contact lugs advantageously extend toward the first end surface of the cell housing, wherein the first end surface and the second end surface, which is situated opposite the first end surface, have the smallest surface area of the sides of the cell housing.

The cover surface, on which the terminals are arranged, and a base surface, which is situated opposite the cover surface, have an intermediate surface area of the sides of the cell housing in this case.

According to an advantageous embodiment of the invention, the anode contact lugs or the cathode contact lugs are electrically connected to a collector which extends between the electrode coil and the base surface, and between the electrode coil and the second end surface. The collector is also electrically connected to one of the terminals in this case.

According to a further advantageous embodiment of the invention, the anode contact lugs or the cathode contact lugs are electrically connected to a collector which extends between the electrode coil and a front surface. The front surfaces have the largest surface area of the sides of the cell housing in this case. The collector is also electrically connected to one of the terminals in this case.

The cell housing is preferably of electrically-insulating design, for example composed of a plastic.

The cell housing can also be of electrically-conductive design, for example composed of aluminum.

In this case, the anode contact lugs or the cathode contact lugs are advantageously electrically connected to the electrically-conductive cell housing. If, in addition, one of the terminals is connected to the electrically-conductive cell housing, the collector can also be omitted.

According to a further embodiment of the invention, an insulating film is provided between the cathode contact lugs and the anode contact lugs, which insulating film extends toward the end surface of the cell housing.

The cathode and the anode are wound, with the interposition of at least one separator, to form the electrode coil. The insulating film is advantageously formed by the at least one separator in this case.

A battery system is also proposed, comprising at least one battery cell according to the invention.

A battery cell according to the invention can be advantageously employed in an electric vehicle (EV), a hybrid electric vehicle (HEV) or a plug-in hybrid electric vehicle (PHEV).

In comparison to a battery cell known from the prior art in which the anode and the cathode project out of the electrode coil on opposite sides, the amount of space required for the collectors within the cell housing is advantageously reduced. The space additionally acquired in this way can be used for increasing the size of the electrode coil, as a result of which the capacity of the battery cell is increased given the same dimensions of the cell housing. The amount of space required for the collectors is also reduced in comparison to a battery cell in which the anode and the cathode project adjacently toward the cover surface on which the terminals are arranged. In the battery cell according to the invention, the collectors in the connection regions to the anode and to the cathode run on the same end surface which has the smallest surface area of the sides of a cuboid cell housing. Therefore, the collectors in the connection regions to the anode and to the cathode require the smallest possible volume.

One of the two collectors is guided from said end surface directly to the adjacent cover surface to form one of the terminals. The other of the two collectors is guided around the electrode coil to form the other terminal. In this case, this collector is of comparatively thin design and takes up only a small volume on its way around the electrode coil.

BRIEF DESCRIPTION OF THE DRAWINGS

Forms of embodiment of the invention are described in greater detail, with reference to the drawings and the following description.

Herein.

DETAILED DESCRIPTION

Figure 1:
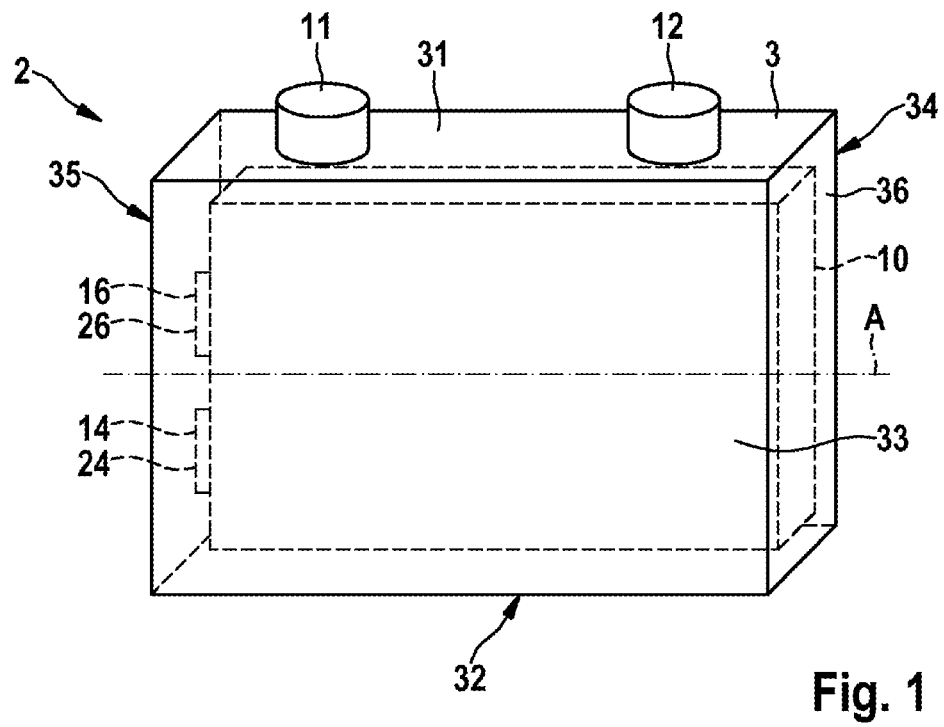
FIG. 1 shows a schematic, perspective and semi-transparent representation of a battery cell, without collectors.

A battery cell 2 comprises a cell housing 3, which is configured as a prism and, in the present case, as a cuboid. In the present case, the cell housing 3 is of electrically-conductive design and is manufactured, for example, from aluminum. It is also conceivable that the cell housing 3 is manufactured to be non-electrically conducting, in particular from an electrically-insulating material, for example plastic, or is coated with an electrically-insulating material.

The battery cell 2 comprises a negative terminal 11 and a positive terminal 12. A voltage delivered by the battery cell 2 can be tapped-off via the terminals 11, 12. Moreover, the battery cell 2 can also be charged via the terminals 11, 12.

The cuboid-shaped cell housing 3 of the battery 2 has six sides with three different surface areas wherein, in each case, sides of equal surface area are arranged in mutually-opposing pairs. The sides with the largest surface area are described hereinafter as the first front surface 33 and the second front surface 34. The sides with the smallest surface area are described hereinafter as the first end surface 35 and the second end surface 36. The remaining sides, of intermediate surface area, are described hereinafter as the cover surface 31 and the base surface 32.

The terminals 11, 12 are arranged, with a mutual spacing, on the cover surface 31 of the cell housing 3. The negative terminal 11 is arranged adjacently to the first end surface 35, and the positive terminal 12 is arranged adjacently to the second end surface 36. Insulators can be provided between the terminals 11, 12 and the cover surface 31.

Within the cell housing 3 of the battery cell 2, an electrode coil 10 is arranged, which comprises two electrodes, namely a cathode 14 and an anode 16. The cathode 14 and the anode 16 are configured as foil-type electrodes and, with the interposition of a first separator 18 and a second separator 19, are wound around a winding axis A of the electrode coil 10. The electrode coil 10 is arranged in the cell housing 3 such that the winding axis A is oriented perpendicularly to the end surfaces 35, 36.

It is also conceivable that the battery cell 2 comprises a plurality of electrode coils 10 which are electrically connected in parallel or, in the presence of sufficient insulation, in series. Moreover, an electrolyte is present within the cell housing 3.

The anode 16 has a plurality of anode contact lugs 26, which are electrically connected to the negative terminal 11 of the battery cell 2. The cathode 14 has a plurality of cathode contact lugs 24, which are electrically connected to the positive terminal 12 of the battery cell 2. The anode contact lugs 26 and the cathode contact lugs 24 project out adjacently from the electrode coil 10 on the same end surface, and extend from the electrode coil 10 to the first end surface 35 of the cell housing 3.

For the electrical connection of the anode 16 to the negative terminal 11, a first collector 41 is provided. The first collector 41 has a first region 42, which is oriented in parallel with the first end surface 35 and adjacent to the first end surface 35, and is connected to the anode contact lugs 26 of the anode 16. The first region 42 of the first collector 41 extends to the cover surface 31, and forms a transition to a second region 43, which is oriented in parallel with the cover surface 31. The second region 43 of the first collector 41 is connected to the negative terminal 11. Electrical insulators are provided between the first collector 41 and the cell housing 3 of the battery cell 2.

For the electrical connection of the cathode 14 to the positive terminal 12, a second collector 51 is provided. The second collector 51 has a first region 52, which is oriented in parallel with the first end surface 35 adjacent to the first end surface 35, and is connected to the cathode contact lugs 24 of the cathode 14. The second collector 51 has a second region 53, which is connected to the positive terminal 12.

Figure 2:
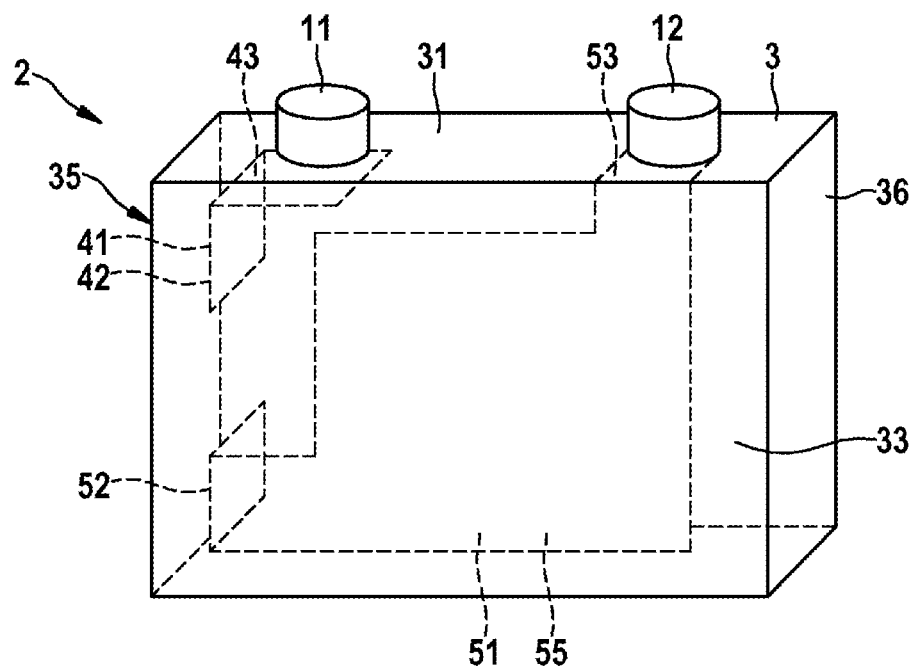
FIG. 2 shows a schematic, perspective and semi-transparent representation of a battery cell according to a first form of embodiment, without electrode coil.

According to a first form of embodiment of the battery cell 2, which is represented in FIG. 2, the second collector 51 has a central region 55, which is connected to the first region 52 and to the second region 53. The central region 55 of the second collector 51 extends in parallel with the front surfaces 33, 34. In the present case, the central region 55 of the second collector 51 is arranged between the electrode coil 10 and the first front surface 33. Electrical insulators are provided between the second collector 51 and the cell housing 3 of the battery cell 2.

The central region 55 of the second collector 51 can also be arranged between the electrode coil 10 and the second front surface 34. Two parallel-oriented central regions 55 of the second collector 51 can also be provided, which are arranged on either side of the electrode coil 10.

Figure 3:
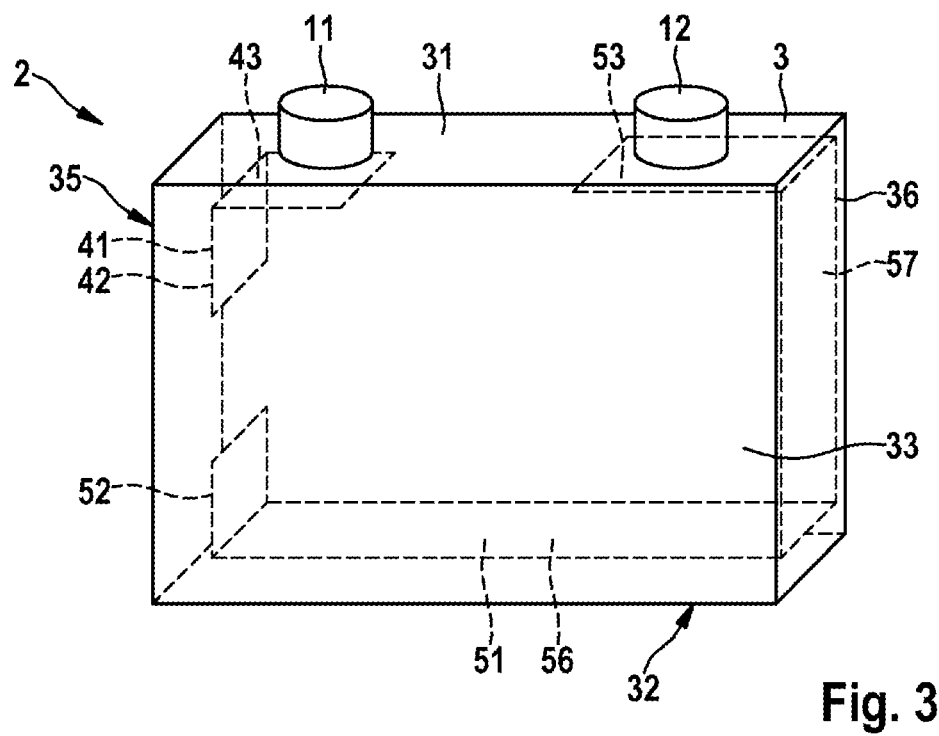
FIG. 3 shows a schematic, perspective and semi-transparent representation of a battery cell according to a second form of embodiment, without electrode coil.

According to a second form of embodiment of the battery cell 2, which is represented in FIG. 3, the second collector 51 has a lower region 56, which is connected to the first region 52. The second collector 51 moreover has a rear region 57, which is connected to the second region 53. The lower region 56 of the second collector 51 is connected to the rear region 57 of the second collector 51.

The lower region 56 of the second collector 51 extends from the first region 52 of the second collector 51, in parallel with the base surface 32 between the electrode coil 10 and the base surface 32, to the second end surface 36. The rear region 57 of the second collector 51 extends from the second region 53 of the second collector 51, in parallel with the second end surface 36 between the electrode coil 10 and the second end surface 36, to the base surface 32. The rear region 57 of the second collector 51 is further connected to the lower region 56 of the second collector 51. Electrical insulators are likewise provided between the second collector 51 and the cell housing 3 of the battery cell 2.

According to a further form of embodiment of the battery cell 2, which is not represented here, the electrically-conductive cell housing 3 is electrically connected to the positive terminal 12. In this case, no insulator is required between the second collector 51 and the cell housing 3.

It is moreover conceivable for the positive terminal 12 and the cathode contact lugs 24 of the cathode 14 to be electrically connected to the cell housing 3. In this case, the cell housing 3 would assume the function of the second collector 51, namely the electrical connection of the cathode 14 to the positive terminal 12. In this case, the second collector 51 could be entirely omitted. It is also conceivable that the second collector 51 electrically connects the cathode contact lugs 24 of the cathode 14 to the first end surface 35 of the cell housing 3.

Figure 4:
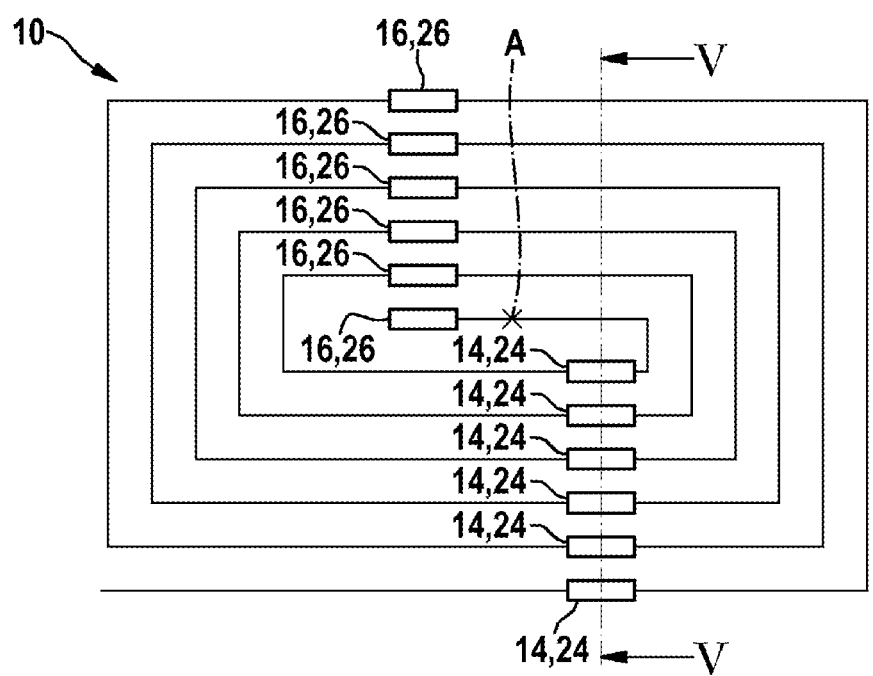
FIG. 4 shows an overhead view of an end face of an electrode coil, prior to installation in a cell housing.

FIG. 4 shows an overhead view of an end surface of the electrode coil 10, prior to the installation in the cell housing 3 of the battery cell 2. The anode contact lugs 26 of the anode 16 project out of the electrode coil 10 in a near-parallel orientation to the winding axis A. The anode contact lugs 26 of the anode 16 are mutually aligned on a line in a direction which is perpendicular to the winding axis A. The cathode contact lugs 24 of the cathode 14 project out of the electrode coil 10 in a near-parallel orientation to the winding axis A. The cathode contact lugs 24 of the cathode 14 are mutually aligned on a line in a direction which is perpendicular to the winding axis A.

Figure 5A:
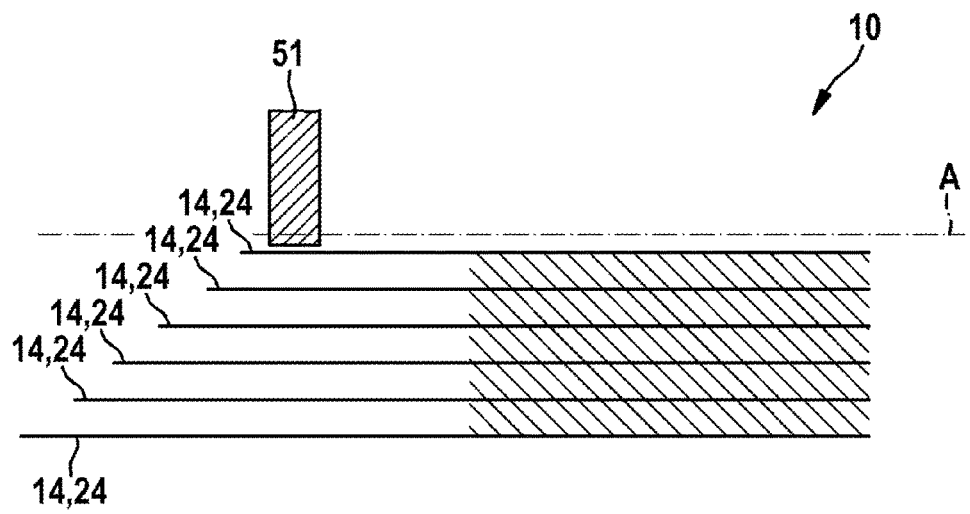
FIG. 5*a* shows a partial sectional representation of the electrode coil represented in FIG. 4, along the section line V-V, prior to connection with a collector.

FIG. 5a shows a partial sectional representation of the electrode coil 10 represented in FIG. 4, along the section line V-V. The part of the electrode coil 10 which incorporates the cathode contact lugs 24 of the cathode 14, prior to connection with the second collector 51, is represented. The second collector 51 is oriented perpendicularly to the winding axis A of the electrode coil 10.

The individual cathode contact lugs 24 of the cathode 14 are of different lengths. The cathode contact lug 24 which is facing the winding axis A is of the shortest length. The length of the cathode contact lugs 24 increases as the clearance of said cathode contact lugs 24 from the winding axis A increases. The cathode contact lug 24 which is averted from the winding axis A is of the longest length.

Figure 5B:
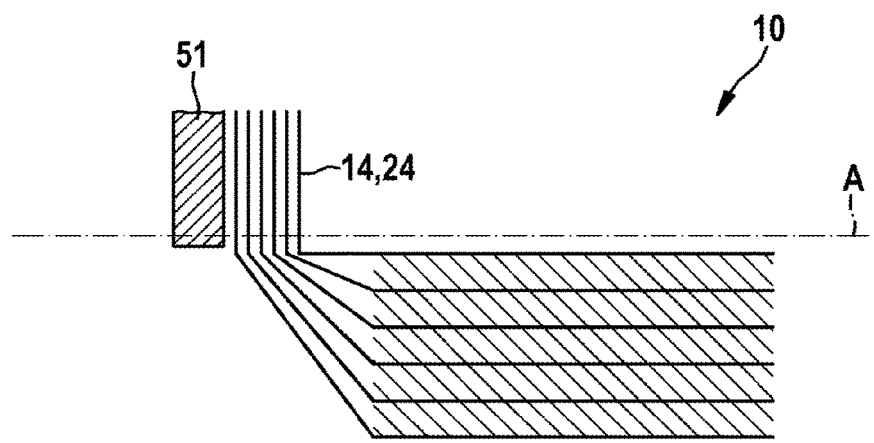
FIG. 5*b* shows the electrode coil represented in FIG. 5*a*, after connection with the collector.

FIG. 5b shows the electrode coil 10 represented in FIG. 5a, after connection with the second collector 51. The individual cathode contact lugs 24 of the cathode 14 are each curved around an axis which is oriented perpendicularly to the winding axis A, and are arranged one on top of another. The cathode contact lug 24 of the cathode 14 which is averted from the winding axis A is in contact with the second collector 51. The cathode contact lugs 24 of the cathode 14 are interconnected, and are connected to the second collector 51, specifically by welding.

The lengths of the individual cathode contact lugs 24 of the cathode 14 are mutually tailored, such that the ends of the cathode contact lugs 24 which are averted from the electrode coil 10 converge with each other, after the connection of the cathode contact lugs 24 with the second collector 51.

Figure 6A:
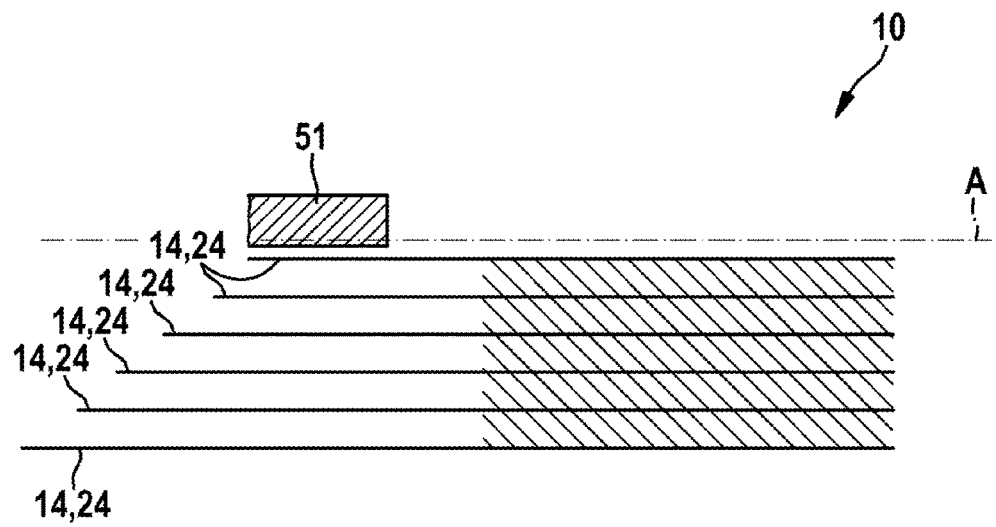
FIG. 6*a* shows a variation of the electrode coil represented in FIG. 5*a*, prior to connection with a collector.

FIG. 6a shows a variation of the electrode coil 10 represented in FIG. 5a, prior to connection with the second collector 51. The second collector 51 is oriented in parallel with the winding axis A of the electrode coil 10.

In said variation of the electrode coil 10, the individual cathode contact lugs 24 of the cathode 14 are of different lengths. The cathode contact lug 24 which is facing the winding axis A and the second collector 51 is of the shortest length. The length of the cathode contact lugs 24 increases as the clearance of said cathode contact lugs 24 from the winding axis A and from the second collector 51 increases. The cathode contact lug 24 which is averted from the winding axis A and from the second collector 51 is of the longest length.

Figure 6B:
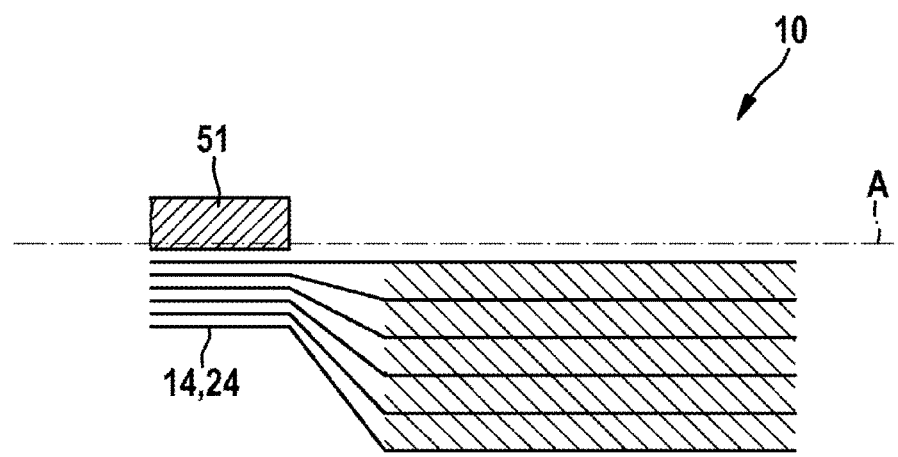
FIG. 6*b* shows the electrode coil represented in FIG. 6*a*, after connection with the collector.

FIG. 6b shows the electrode coil 10 represented in FIG. 6a, after connection with the second collector 51. The individual cathode contact lugs 24 of the cathode 14 are arranged one on top of another. The cathode contact lug 24 of the cathode 14 which is averted from the winding axis A is in contact with the second collector 51. The cathode contact lugs 24 of the cathode 14 are interconnected, and are connected to the second collector 51, specifically by welding.

In said variation of the electrode coil 10, the lengths of the individual cathode contact lugs 24 of the cathode 14 are mutually tailored, such that the ends of the cathode contact lugs 24 which are averted from the electrode coil 10 converge with each other, after the connection of the cathode contact lugs 24 with the second collector 51.

Figure 7:
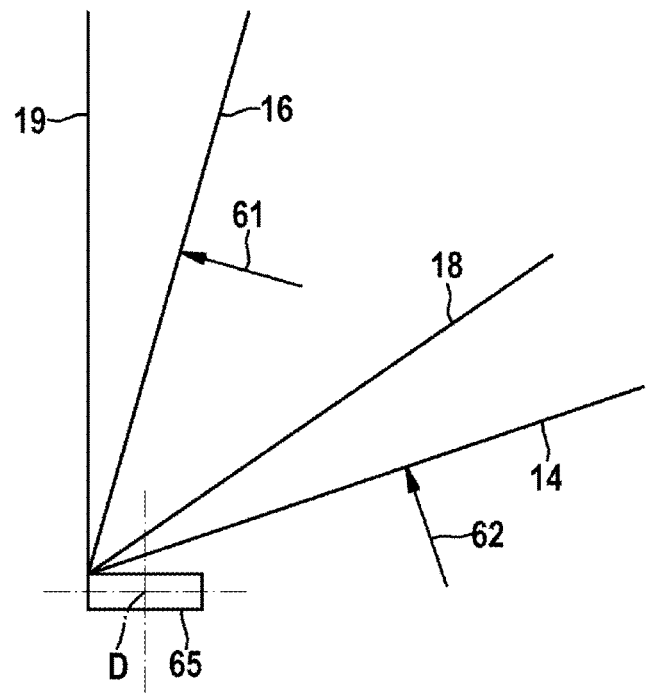
FIG. 7 shows a schematic representation of the manufacture of an electrode coil.

FIG. 7 shows a schematic representation of the manufacture of the electrode coil 10. A winding core 65 is rotated around an axis of rotation D. A cathode 14 of foil-type design, a first separator 18 of foil-type design, an anode 16 of foil-type design and a second separator 19 of foil-type design are attached to the winding core 65. The axis of rotation D of the winding core 65 is aligned with the winding axis A of the electrode coil 10.

By the rotation of the winding core 65, the cathode 14, the first separator 18, the anode 16 and the second separator 19 are wound onto the winding core 65. One of the separators 18, 19 is thus arranged respectively between the cathode 14 and the anode 16.

A first laser beam 61 cuts off an edge region of the foil-type anode 16. However, the anode contact lugs 26 of the anode 16 are set in place. After one full rotation of the winding core 65 respectively, one of the anode contact lugs 26 of the anode 16 is set in place. This ensures that the anode contact lugs 26 of the anode 16, as represented in FIG. 4, are mutually aligned on a line.

The length of the set anode contact lugs 26 of the anode 16 increases with each rotation. Thus, the anode contact lug 26 of the anode 16 which is facing the axis of rotation D and the winding axis A has the shortest length, and the anode contact lug 26 of the anode 16 which is averted from the axis of rotation D and from the winding axis A has the longest length.

A second laser beam 62 cuts off an edge region of the foil-type cathode 14. However, the cathode contact lugs 24 of the cathode 14 are set in place. After one full rotation of the winding core 65 respectively, one of the cathode contact lugs 24 of the cathode 14 is set in place. This ensures that the cathode contact lugs 24 of the cathode 14, as represented in FIG. 4, are mutually aligned on a line.

The length of the set cathode contact lugs 24 of the cathode 14 increases with each rotation. Thus, the cathode contact lug 24 of the cathode 14 which is facing the axis of rotation D and to the winding axis A has the shortest length, and the cathode contact lug 24 of the cathode 14 which is averted from the axis of rotation D and from the winding axis A has the longest length, as represented in FIG. 5a.

Once the cathode 14, the anode 16 and the separators 18, 19 are fully wound, the winding core 65 can be removed. The electrode coil 10 can then be gently compressed together, such that the void left by the absent winding core 65 is closed.

Figure 8:
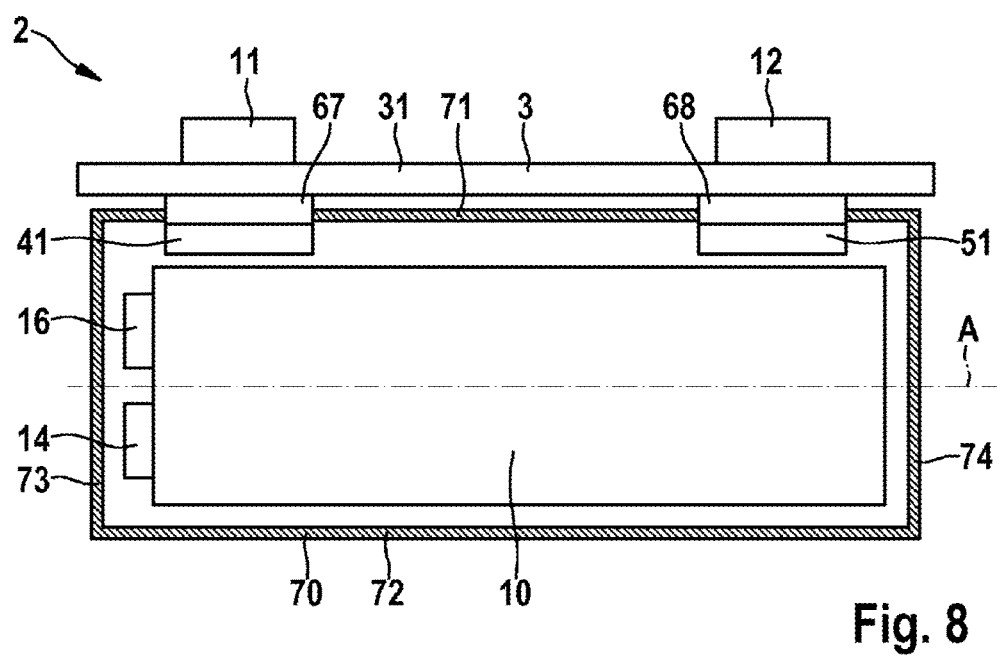
FIG. 8 shows a schematic sectional representation of a battery cell with a first form of embodiment of a holder for the electrode coil.

FIG. 8 shows a schematic sectional representation of a battery cell 2 with a holder 70 according to a first form of embodiment for an electrode coil 10. The collectors 41, 51 are not fully represented.

The holder 70 according to a first form of embodiment is configured as a rectangular frame, and formed of a non-electrically-conductive material, specifically of a plastic. The holder 70 according to the first form of embodiment comprises a first long side 71 and a second long side 72, which is oriented in parallel with the first long side 71. The first long side 71 and the second long side 72 are interconnected at their ends by a first short side 73 and a second short side 74. The first short side 73 and the second short side 74 are mutually parallel, and are oriented at right-angles to the long sides 71, 72.

The first long side 71 of the frame-type holder 70, according to the first form of embodiment, is fastened to the cover surface 31 of the cell housing 3 of the battery cell 2. From the ends of the first long side 71 of the holder 70, according to the first form of embodiment, the first short side 73 and the second short side 74 project at right-angles from the cover surface 31 to the unrepresented base surface 32 of the cell housing 3. The first short side 73 is thus oriented adjacently to the unrepresented first end surface 35 of the cell housing 3, and the second short side 74 is oriented adjacently to the unrepresented second end surface 36 of the cell housing 3. The second long side 72 is oriented adjacently to the unrepresented base surface 32 of the cell housing 3.

The electrode coil 10 is clamped in the frame-type holder 70 according to the first form of embodiment. The winding axis A of the electrode coil 10 is thus oriented in parallel with the long sides 71, 72 of the holder 70 according to the first form of embodiment. The anode 16 and the cathode 14 project from the electrode coil 10, adjacent to the first short side 73 of the holder 70 according to the first form of embodiment.

The first collector 41 of the battery cell 2 is electrically and mechanically connected to the negative terminal 11. A first spacer 67 is arranged between the first collector 41 and the cover surface 31 of the cell housing 3. The first spacer 67 is formed of a non-electrically-conductive material, specifically of a plastic, and electrically insulates the first collector 41 from the cover surface 31 of the cell housing 3. The first spacer 67 is thus mechanically attached to the cover surface 31 on the interior of the cell housing 3.

The second collector 51 of the battery cell 2 is electrically and mechanically connected to the positive terminal 12. A second spacer 68 is arranged between the second collector 51 and the cover surface 31 of the cell housing 3. The second spacer 68 is formed of a non-electrically-conductive material, specifically of a plastic, and electrically insulates the second collector 51 from the cover surface 31 of the cell housing 3. The second spacer 68 is thus mechanically attached to the cover surface 31 on the interior of the cell housing 3.

The first long side 71 of the holder 70 according to the first form of embodiment is mechanically connected to the first spacer 67 and to the second spacer 68. The first long side 71 of the holder 70 according to the first form of embodiment, in the manner of a clip-on connection, is compressed into corresponding recesses in the spacers 67, 68, and is retained therein in a form-fitting manner. It is also conceivable that the holder 70 according to the first form of embodiment is configured in a one-piece arrangement with the spacers 67, 68.

Figure 9:
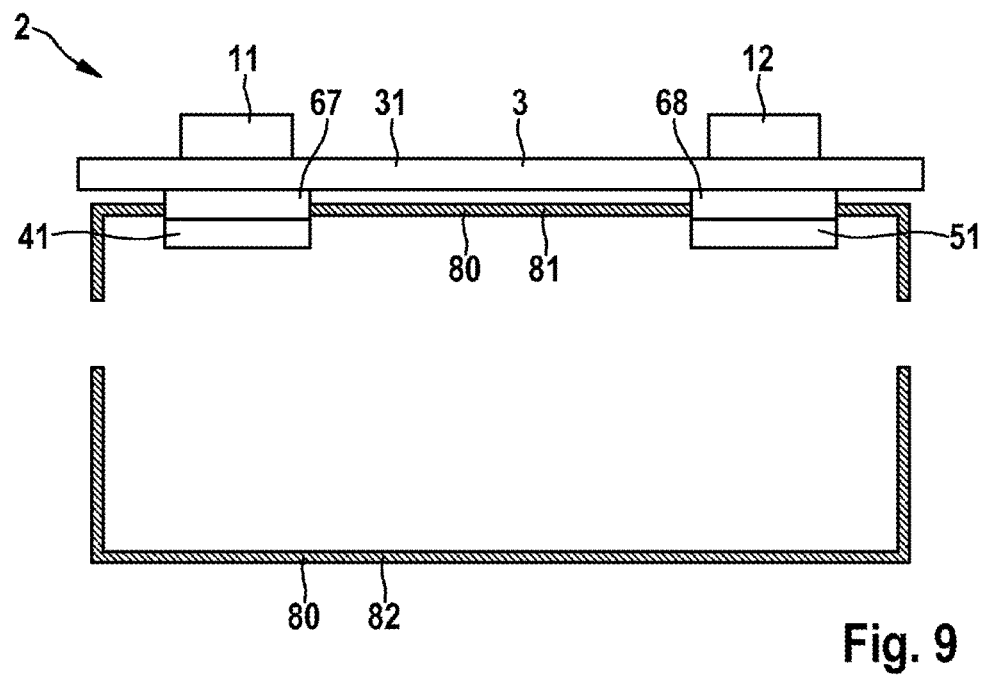
FIG. 9 shows a schematic sectional representation of a battery cell with a second form of embodiment of a holder for the electrode coil.

FIG. 9 shows a schematic sectional representation of a battery cell 2 with a holder 80 according to a second form of embodiment for an unrepresented electrode coil 10. The collectors 41, 51 are not fully represented.

The holder 80 according to the second form of embodiment is configured in the form of an at least substantially closed box, and is formed of a non-electrically-conductive material, specifically of a plastic. The holder 80 according to the second form of embodiment comprises a cover region 81 and a base region 82.

The cover region 81 of the holder 80 according to the second form of embodiment is fastened to the cover surface 31 of the cell housing 3 of the battery cell 2. In the representation shown, the base region 82 is arranged with a clearance from the cover region 81. The base region 82, after connection of the unrepresented electrode coil 10, is compressed against the cover region 81 and latches onto the cover region 81 in a form-fitting manner. The unrepresented electrode coil 10 is then surrounded by the holder 80 configured in the form of a box according to the second form of embodiment.

The first collector 41 of the battery cell 2 is electrically and mechanically connected to the negative terminal 11. A first spacer 67 is arranged between the first collector 41 and the cover surface 31 of the cell housing 3. The first spacer 67 is formed of a non-electrically-conductive material, specifically of a plastic, and electrically insulates the first collector 41 from the cover surface 31 of the cell housing 3. The first spacer 67 is thus mechanically attached to the cover surface 31 on the interior of the cell housing 3.

The second collector 51 of the battery cell 2 is electrically and mechanically connected to the positive terminal 12. A second spacer 68 is arranged between the second collector 51 and the cover surface 31 of the cell housing 3. The second spacer 68 is formed of a non-electrically-conductive material, specifically of a plastic, and electrically insulates the second collector 51 from the cover surface 31 of the cell housing 3. The second spacer 68 is thus mechanically attached to the cover surface 31 on the interior of the cell housing 3.

The cover region 81 of the holder 80 according to the second form of embodiment is mechanically connected to the first spacer 67 and to the second spacer 68. The cover region 81 comprises clips which, in the manner of a clip-on connection, are compressed into corresponding recesses in the spacers 67, 68, and are retained therein in a form-fitting manner. It is also conceivable that the cover region 81 is configured in a one-piece arrangement with the spacers 67, 68.

Figure 10:
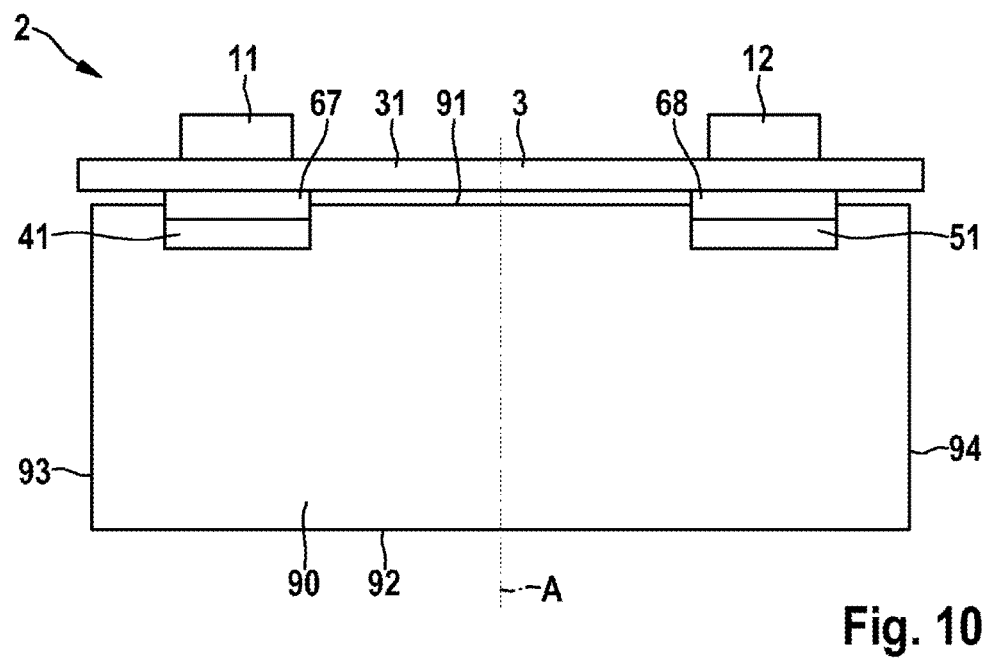
FIG. 10 shows a schematic sectional representation of a battery cell with a third form of embodiment of a holder for the electrode coil.

FIG. 10 shows a schematic sectional representation of a battery cell 2 with a holder 90 according to a third form of embodiment for an unrepresented electrode coil 10. The collectors 41, 51 are not fully represented.

The holder 90 according to the third form of embodiment is configured as a rectangular planar object, and is formed of a non-electrically-conductive material, specifically of a plastic. The holder 90 according to the third form of embodiment is delimited by a top side 91, a base side 92 which is oriented in parallel with the top side 91, a first outer side 93 and a second outer side 94. The first outer side 93 and the second outer side 94 are oriented in a mutually parallel arrangement, and at right-angles to the top side 91 and the base side 92.

The top side 91 of the holder 90 according to the third form of embodiment is fastened to the cover surface 31 of the cell housing 3 of the battery cell 2. The first outer side 93 and the second outer side 94 project at right-angles from the cover surface 31 to the unrepresented base surface 32 of the cell housing 3. The first outer side 93 is thus oriented adjacently to the unrepresented first end surface 35 of the cell housing 3, and the second outer side 94 is oriented adjacently to the unrepresented second end surface 36 of the cell housing 3. The base side 92 is oriented adjacently to the unrepresented base surface 32 of the cell housing 3.

The unrepresented electrode coil 10 is wound around the holder 90 according to the third form of embodiment. The winding axis A of the electrode coil 10 is thus oriented at right-angles to the top side 91 of the holder 90 according to the third form of embodiment, and at right-angles to the cover surface 31 of the cell housing 3. The anode 16, the cathode 14 and the separators 18, 19 are thus arranged around the outer sides 93, 94 of the holder 90 according to the third form of embodiment.

The first collector 41 of the battery cell 2 is electrically and mechanically connected to the negative terminal 11. A first spacer 67 is arranged between the first collector 41 and the cover surface 31 of the cell housing 3. The first spacer 67 is formed of a non-electrically-conductive material, specifically of a plastic, and electrically insulates the first collector 41 from the cover surface 31 of the cell housing 3. The first spacer 67 is thus mechanically attached to the cover surface 31 on the interior of the cell housing 3.

The second collector 51 of the battery cell 2 is electrically and mechanically connected to the positive terminal 12. A second spacer 68 is arranged between the second collector 51 and the cover surface 31 of the cell housing 3. The second spacer 68 is formed of a non-electrically-conductive material, specifically of a plastic, and electrically insulates the second collector 51 from the cover surface 31 of the cell housing 3. The second spacer 68 is thus mechanically attached to the cover surface 31 on the interior of the cell housing 3.

The top side 91 of the holder 90 according to the third form of embodiment is mechanically connected to the first spacer 67 and to the second spacer 68. The top side 91 of the holder 90 according to the third form of embodiment, in the manner of a clip-on connection, is compressed into corresponding recesses in the spacers 67, 68, and is retained therein in a form-fitting manner. It is also conceivable that the holder 90 according to the third form of embodiment is configured in a one-piece arrangement with the spacers 67, 68.

Figure 11:
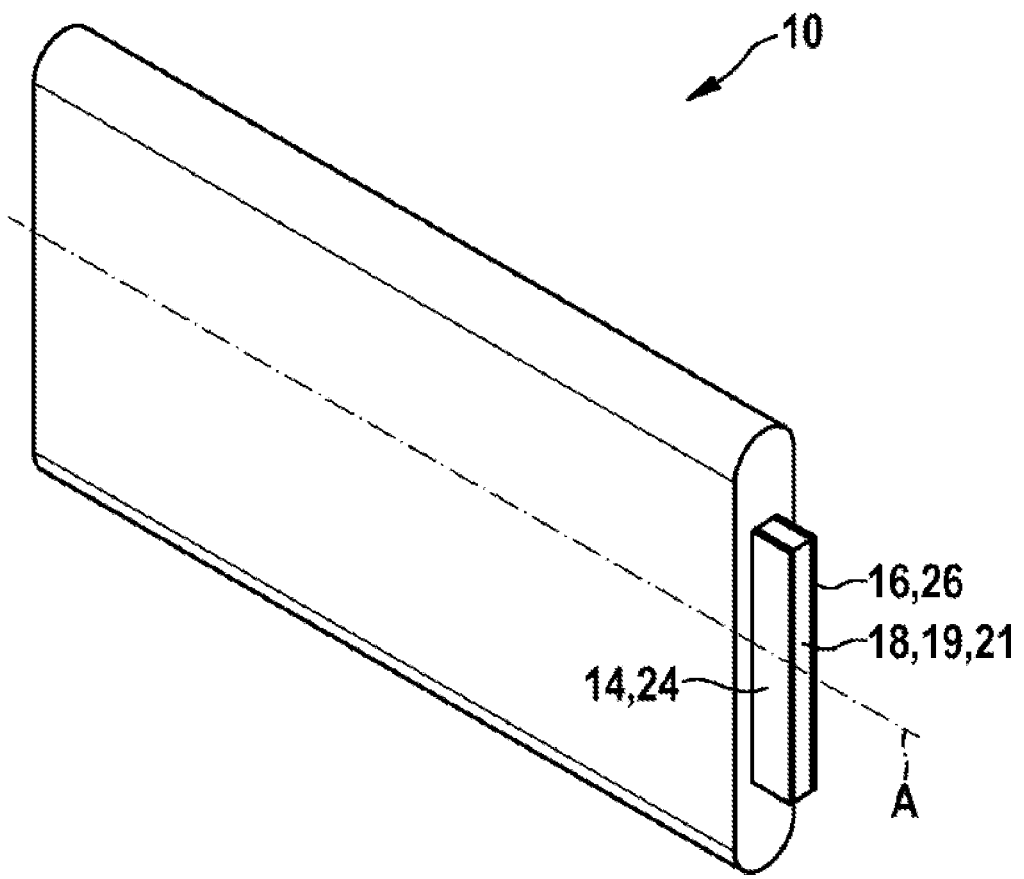
FIG. 11 shows a further variation of an electrode coil in a schematic perspective representation.

A further variation of an electrode coil 10 is shown in a schematic perspective representation in FIG. 11. The cathode contact lugs 24 of the cathode 14 and the anode contact lugs 26 of the anode 16 project out adjacently from the electrode coil 10 on the same end side. The anode contact lugs 26 of the anode 16 and the cathode contact lugs 24 of the cathode 14 project out of the electrode coil 10 in a near-parallel orientation to the winding axis A in this case.

Between the cathode contact lugs 24 and the anode contact lugs 26, parts of the first separator 18 and of the second separator 19 project out of the electrode coil 10 on the same end side in this case. In this case, said parts of the first separator 18 and of the second separator 19 extend parallel with the cathode contact lugs 24 and the anode contact lugs 26 and with the winding axis A toward the first end surface 35 of the cell housing 3.

The parts of the first separator 18 and of the second separator 19, which parts project out of the electrode coil 10, serve as an insulating film 21 in this case and electrically insulate the cathode contact lugs 24 of the cathode 14 from the anode contact lugs 26 of the anode 16.

The invention is not limited to the exemplary embodiments described and the aspects highlighted therein. Rather, within the scope indicated by the claims, a plurality of variations are possible, which lie within the practice of a person skilled in the art.

The invention claimed is:

1. A battery cell (2) comprising a prismatically-designed cell housing (3) having a cover surface (31), on which a negative terminal (11) and a positive terminal (12) are arranged projecting outwardly from the cover surface (31), and comprising at least one electrode coil (10) arranged within the cell housing (3), the electrode coil having a cathode (14), which has cathode contact lugs (24), and the electrode coil having an anode (16), which has anode contact lugs (26), wherein the cathode contact lugs (24) and the anode contact lugs (26) extend adjacently from the electrode coil (10) toward precisely one end surface (35, 36) of the cell housing (3), and wherein the end surface (35, 36) is oriented at right-angles to the cover surface (31).

2. The battery cell (2) as claimed in claim 1, characterized in that the cell housing (3) is cuboid-shaped and has six sides (31, 32, 33, 34, 35, 36) with three different surface areas wherein, in each case, two sides (31, 32, 33, 34, 35, 36) of equal surface area are situated opposite one another.

3. The battery cell (2) as claimed in claim 2, characterized in that the cathode contact lugs (24) and the anode contact lugs (26) extend toward a first end surface (35) of the cell housing (3), wherein the first end surface (35) and a second end surface (36), which is situated opposite the first end surface (35), have the smallest surface area of the sides (31, 32, 33, 34, 35, 36) of the cell housing (3).

4. The battery cell (2) as claimed in claim 3, characterized in that the cover surface (31) and a base surface (32), which is situated opposite the cover surface (31), have an intermediate surface area of the sides (31, 32, 33, 34, 35, 36) of the cell housing (3).

5. The battery cell (2) as claimed in claim 4, characterized in that the cathode contact lugs (24) or the anode contact lugs (26) are electrically connected to a collector (51) which extends between the electrode coil (10) and the base surface (32), and between the electrode coil (10) and the second end surface (36).

6. The battery cell (2) as claimed in claim 2, wherein the cell housing has opposite front surfaces (33, 34), and wherein the cathode contact lugs (24) or the anode contact lugs (26) are electrically connected to a collector (51) which extends between the electrode coil (10) and one of the front surfaces (33, 34), wherein the front surfaces (33, 34) have the largest surface area of the sides (31, 32, 33, 34, 35, 36) of the cell housing (3).

7. The battery cell (2) as claimed in claim 1, characterized in that the cell housing (3) is of electrically-insulating design.

8. The battery cell (2) as claimed in claim 1, characterized in that the cell housing (3) is of electrically-conductive design.

9. The battery cell (2) as claimed in claim 8, characterized in that the cathode contact lugs (24) or the anode contact lugs (26) are electrically connected to the cell housing (3).

10. The battery cell (2) as claimed in claim 1, characterized in that an insulating film (21) is provided between the cathode contact lugs (24) and the anode contact lugs (26), which insulating film extends toward the end surface (35, 36) of the cell housing (3).

11. The battery cell (2) as claimed in claim 10, characterized in that the cathode (14) and the anode (16) are wound, with the interposition of at least one separator (18, 19), to form the electrode coil (10), and in that the insulating film (21) is formed by the at least one separator (18, 19).

12. A battery system comprising at least one battery cell (2) as claimed in claim 1.

13. The battery cell (2) as claimed in claim 1, wherein the negative terminal (11) and the positive terminal (12) are arranged with a mutual spacing on the cover surface (31) so that the negative terminal is arranged adjacently to the one end surface (35) and the positive terminal (12) is arranged adjacent to another end surface (36).

14. A vehicle comprising at least one battery cell (2) as claimed in claim 1, wherein the vehicle is one from a group consisting of an electric vehicle, a hybrid electric vehicle, and a plug-in hybrid electric vehicle, and the at least one battery cell (2) is employed to drive the vehicle.

15. The battery cell (2) as claimed in claim 1, including a collector (51) electrically connected to the cathode contact lugs (24) and to the positive terminal (12), wherein the collector (51) extends between the electrode coil (10) and the base surface (32), and between the electrode coil (10) and the second end surface (36).

16. The battery cell (2) as claimed in claim 15, including a collector (41) electrically connected to the anode contact lugs (26) and to the negative terminal (11), and wherein the negative terminal is arranged adjacently to the first end surface (35) and the positive terminal (12) is arranged adjacent to the second end surface (36).

17. The battery cell (2) as claimed in claim 1, wherein the cathode (14) and the anode (16), with the interposition of a first separator (18) and a second separator (19), are wound around a winding axis A of the electrode coil (10), wherein the individual cathode contact lugs (24) of the cathode (14) are of different lengths, and wherein the cathode contact lug (24) which is facing the winding axis A is of the shortest length.

18. The battery cell (2) as claimed in claim 1, wherein a first front surface (33) is larger than the cover surface (31).

19. The battery cell (2) as claimed in claim 1, wherein the individual cathode contact lugs (24) of the cathode (14) are each curved around an axis which is oriented perpendicularly to the winding axis A, and are arranged one on top of another.

* * * * *